United States Patent
Gill

(10) Patent No.: US 7,455,331 B2
(45) Date of Patent: Nov. 25, 2008

(54) DOUBLED-UP PIPE COUPLING

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 11/799,300

(22) Filed: Apr. 30, 2007

(65) Prior Publication Data

US 2008/0106096 A1     May 8, 2008

(51) Int. Cl.
*F16L 23/00*     (2006.01)
(52) U.S. Cl. .............. 285/412; 285/332.1; 285/334.1; 285/368
(58) Field of Classification Search ............ 285/332.1, 285/334.1, 368, 412–414, 417
See application file for complete search history.

(56) References Cited

U.S. PATENT DOCUMENTS

| | | | | |
|---|---|---|---|---|
| 787,791 | A * | 4/1905 | Reynolds | 285/368 |
| 1,819,086 | A * | 8/1931 | Friend | 285/13 |
| 1,851,574 | A * | 3/1932 | Fiederlein | 285/332 |
| 2,014,355 | A * | 9/1935 | Hussman | 285/45 |
| 2,070,291 | A * | 2/1937 | McHugh | 285/55 |
| 2,146,218 | A * | 2/1939 | Kimmich et al. | 285/222.2 |
| 2,568,414 | A * | 9/1951 | Russ | 285/55 |
| 5,715,857 | A | 2/1998 | Gill | |
| 5,723,814 | A * | 3/1998 | Kolbl et al. | 174/31 R |
| 6,302,452 | B1 * | 10/2001 | Schlicht | 285/363 |
| 6,672,334 | B2 | 1/2004 | Gill | |

OTHER PUBLICATIONS

Straub Technical Manual, Jun. 2001, p. 4.

* cited by examiner

*Primary Examiner*—Aaron Dunwoody
*Assistant Examiner*—Fannie Kee
(74) *Attorney, Agent, or Firm*—Thorpe North & Western, LLP

(57) ABSTRACT

A multipurpose coupling is made of two pieces incorporating a partitioning washer ring between them. The coupling is provided with a centrally located interlocking, doubled-up mechanical mechanism, comprised of two mechanisms, where each mechanism performs its intended function in sequence to connect the two pieces of the coupling body, and to secure the coupling to the ends of two pipes simultaneously. The first part of the doubled up mechanism includes two main radial flanges on the inner end of each piece of the coupling body which are held together face to face between secondary radial flanges by means of fasteners extending between the secondary radial flanges. The second part of the doubled up mechanism includes a cylindrical cover having intermittent inner radial shoulders which are interlockable upon rotation of the cylindrical cover with radial flange shoulders positioned intermittently around the main radial flanges. When the respective cover inner radial shoulders and flange shoulders are interlocked, the cover is locked in position to prevent rotation of the cover with respect to the main flanges and to hold the coupling body pieces in connected condition.

8 Claims, 18 Drawing Sheets

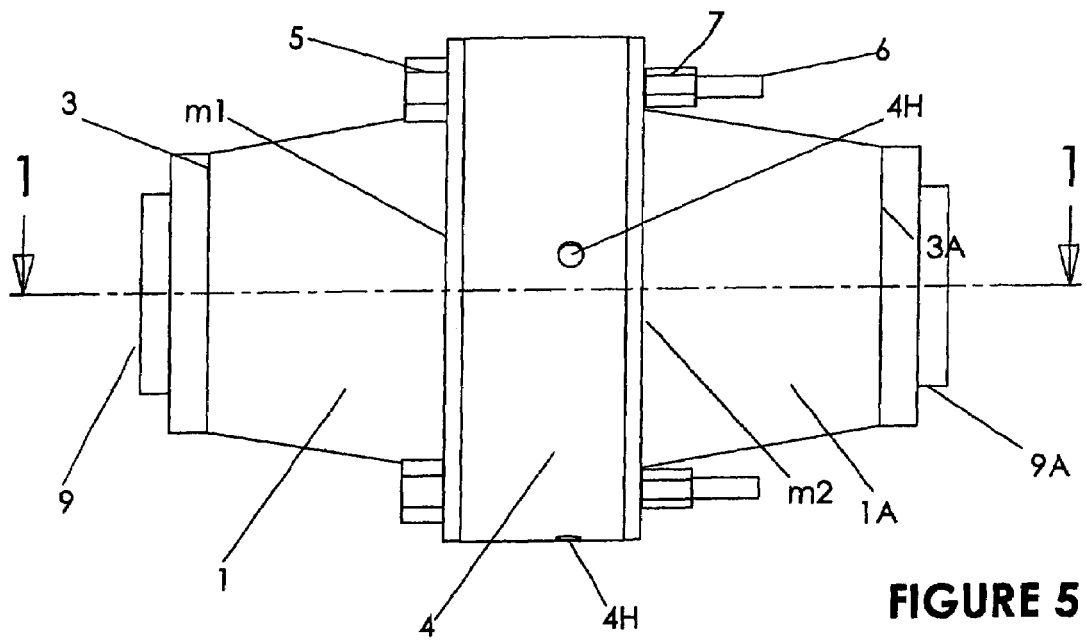
FIGURE 5
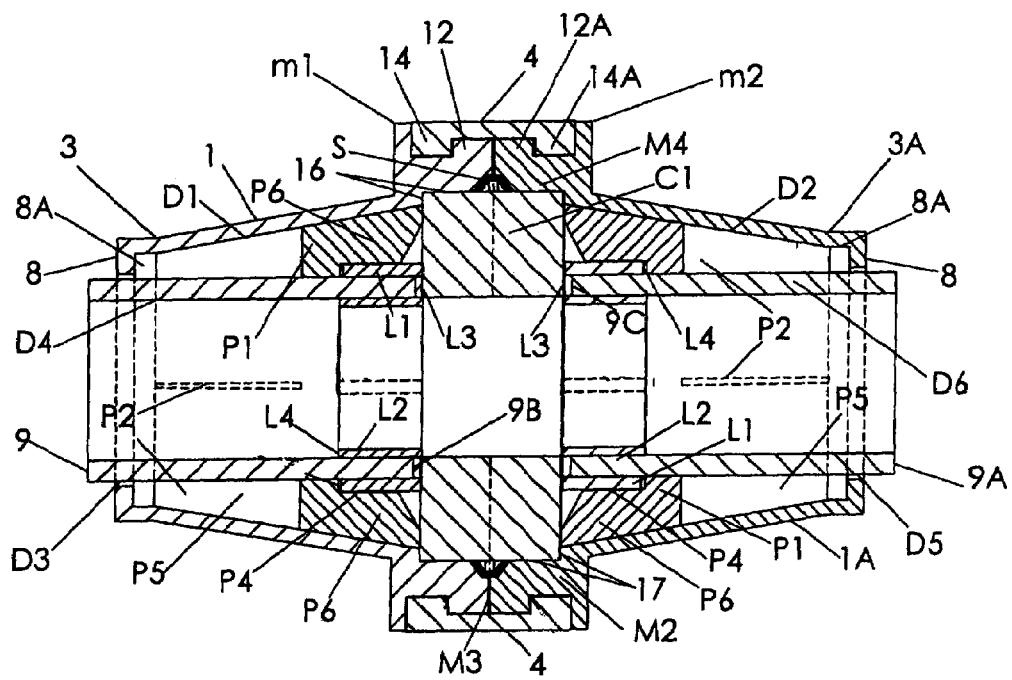
SECTION 1-1 FIGURE 6

DOUBLED-UP PIPE COUPLING

BACKGROUND OF THE INVENTION

1. Field

The invention is in the field of couplings to connect plain end and grooved end pipes, and pipes having shoulders in their end portions, and couplings used to connect pipes with valves and dead ends in piping systems.

2. State of the Art

Plain end couplings under the names of Norma Normaconnect and Straub Pipe Joints are currently in use to join two plain end pipes. A grooved end coupling, under the name of Victaulic Coupling is used to join grooved end pipes. The above coupling is limited in its ability to be suitable to meet various needs of the pipe systems which transport fluids. The invented coupling is a multipurpose coupling, which can provide a restrained joint between two ends of pipes having grooves or shoulders in the end portions of said pipes, or an unrestrained joint for plain end pipes without having said grooves or shoulders in the end portion of pipes. The invented coupling can also provide a restrained joint on its one end, while providing an unrestrained joint on its other end. The invented coupling is made of two pieces, where, in most applications, each piece is a mirror view of the other piece. Each piece houses means which surround the pipe to hold the pipe inside the coupling. If the downstream pipe is of a different size than, and if it is made from different material than, the upstream pipe, then the design and size of the down stream piece of the invented coupling is adjusted and modified. To prevent the pipes from slipping from the coupling, the invented coupling, inside of its body, is fitted with a removable centrally located partitioning washer ring incorporated between said two pieces. Once the pipe is installed, said partitioning ring, located at the center of the coupling body, allows only limited movement of the pipes inside of the body of the coupling, and thus prevents migration of the coupling with respect to the pipe, and therefore also prevents the ends of the pipes from being pulled out from the coupling body. The invented coupling is provided with a centrally located interlocking, doubled-up mechanical mechanism means, comprised of two mechanisms, where each mechanism performs its intended function in sequence to connect two said pieces of the coupling body, and to secure the coupling to the ends of two pipes. The invented coupling can be split axially into two pieces. Said doubled-up mechanism can also be used to join two split bodies of valves which split axially, as valves invented by the inventor under patent numbers U.S. Pat. Nos. 6,672,334 B2 and 5,715,857. It can also be used to connect dead ends in the pipe system, and also valves and other fitting can be incorporated into the coupling between the ends of pipes being connected. Compared to other compression couplings, which are comprised of a sleeve situated between two flanges, where said sleeve and flanges are secured with bolts, the invented coupling can be secured to the ends of pipes much more quickly, with the use of far fewer bolts in the case of large size pipes (six inch, and larger pipe). Therefore, the invented coupling can also release the pipes more quickly than said compression couplings, for large pipe sizes. The first part of said interlocking doubled-up mechanism of the invented coupling is comprised of two secondary flanges m1 and m2, which are constructed farthest away from the radial center plane M3 of the coupling on the corresponding outer rims of the main flanges M1 and M2. The main flanges are held together face to face around the radial plane M3 of the coupling body. The secondary flanges are connected together by means of bolts and nuts to match the intermittent radial shoulders 12 and 12A constructed around the opposite main flanges M1 and M2. The second part of the doubled-up mechanism is made of a cover means provided with intermittent inner radial shoulders 14 and 14A in its end portions, which can be simultaneously rotated between said two secondary flanges m1 and m2 and intermittent radial shoulders 12 and 12A constructed around said two main flanges M1 and M2. Once the inner radial intermittent shoulders 14 and 14A of the cylindrical cover are positioned against the intermittent shoulders 12 and 12A in the locking position, shoulders 14 and 14A can then be locked in position by means of at least a single bolt and nut, and the coupling is secured to the two end portions of the pipes. The coupling can accommodate the predetermined shrinkage (the Poisson's effect) in the lengths of each link of pipe, and their thermal expansion and contraction. The doubled-up mechanism makes the coupling versatile to meet various needs of the piping system. From here on, "end of pipe", "end of valve", and "dead end", will be considered as synonymous in meaning. The following are the objectives of the invented coupling: (1) The first object of the invention is to provide a centralized separable interlocking doubled-up coupling mechanism for the coupling, by which the coupling joins two ends of opposite pipes of the same size, or pipes of different sizes, made from the same type of material, or pipes which are made from different types of materials. (2) The second object of the invention is to provide a coupling such that at least one of the two pieces of the coupling body housing inner means can be used to connect two pipes. (3) The third object of the invention is to provide a coupling where said inner means which surrounds and holds the end portion of pipe inside of coupling body, are modifiable, and include pipe inserts and seal gaskets. (4) The fourth object of the invention is to provide a coupling which can accommodate the shrinkage (the Poisson's effect) of each link of pipe. (5) The fifth object of the invention is to provide a coupling which can accommodate the change in the length of pipe due to thermal effect. (6) The sixth object of the invented coupling is that each end portion of the coupling body beyond the secondary flanges m1 and m2 be modifiable, while retaining the same doubled-up mechanism in all cases. (7) The seventh object of the invention is to provide a partitioning means incorporated between said two pieces of coupling, whereby the coupled pipes are prevented from being pulled out from the coupling body. (8) The eight object of the invention is to provide a coupling where each half of the coupling body can be axially parted into two pieces, and said two pieces can be assembled or disassembled around the pipe. From here on, the coupling body will be understood to have two pieces, and each of the two pieces can be monolithic in structure or can be a structure which can be axially separated into two parts.

SUMMARY OF INVENTION

According to the invention, a two piece coupling for connecting the end portions of two pipes include two pieces 1 and 1A, where piece 1 and piece 1A are held together by means of a shared interlocking doubled up mechanism. Except in cases where two different sizes of pipes are being connected, or where said two pipes are made from different types of materials, the first piece of coupling is the exact mirror of the second piece. For ease of description of the invention, from here on, the assumption will be made that first piece 1 is the mirror view of the second piece 1A. Each said piece has a receiving opening therein so that the coupling body closely receives and surrounds the end portions of the pipes to be coupled. Except for the interlocking doubled up mechanism of the outer body (which does not change), the outer body of each said piece of coupling and the inner means to surround and hold the pipe inside the coupling body are modifiable to meet various needs in the pipe system. Said inner means are separated by means of a partitioning washer ring incorporated between main flanges M1 and M2 of piece 1 and piece 1A.

In the first alternative, the receiving opening in each piece of the coupling body has an inner end taper converging toward its outer end, and it provides an enclosure for a plug means (from here on, seal gaskets to block axial fluid leakage, and backup rings for said seal gaskets, may be considered as plugs), which are means to seal axial leakage of fluid from the coupling body and can also be means to grip around the end portion of the pipe to hold the pipe securely inside the coupling body. Fluid pressure is brought to bear against the plugs with the agency of fluid pressure in the pipeline to establish a firm grip of the plugs around the end portions of pipes. Two pieces of the coupling body are connected end to end by means of doubled up (two distinct parts of) mechanical means, where the first part is made of two secondary flanges m1 and m2 constructed farthest away from the inner radial faces of two main flanges M1 and M2, respectively, where flanges m1 and m2 are held in a locked position by means of bolts 5 and nuts 7 shown in FIG. 2. Main flanges M1 and M2 are provided with an intermittent plurality of radial shoulders 12 and 12A farthest away from radial flanges m1 and m2. The second part of the mechanical means is made of a cylindrical cover means 4 provided with a plurality of intermittent inner radial shoulders 14 and 14A (in the end portions of the cylindrical cover) which can be rotated between said flanges m1 and m2 and intermittent radial shoulders 12 and 12A constructed around main flanges M1 and M2. Shoulders 12 and 12A on each of said main flanges are of the same length as are their counter part inner shoulders 14 and 14A in the cover. The intermittent radial shoulders constructed on the opposite main flanges are held in the matching position, face to face, by means of bolts, to exert a predetermined compression pressure by the coupling outer body against the plug means mounted around the end portions of the pipes. By rotating the cylindrical cover 4, the intermittent inner shoulders 14 and 14A of cover 4 are interlocked against the intermittent shoulders 12 and 12A constructed around main flanges M1 and M2, and they are locked in position by means of at least one bolt L and nut 7. Thus the coupling is secured to the two end portions of the pipes. A radial seal S means at the center of the coupling body is provided to stop the radial leakage through the coupling body. Once said inner intermittent radial flanges of the cover 4 have been engaged against intermittent shoulders around said main flanges, then the bolts can be relaxed, and are left on the coupling body. The pressure on bolts 5 is transferred to the intermittent locked said shoulders. A removable partitioning radial washer ring incorporated between main flanges M1 and M2 is provided at the center of the coupling to prevent the pipe from being pulled out of the coupling body. The partitioning washer ring allows only a limited amount of axial movement of each pipe. The required length of the coupling depends on the size and material of the pipe and the fluid pressure in the pipeline. In case of plastic pipe, if required, the coupling can be provided with inner inserts inside the pipe to mitigate energy loss through the pipe system.

The second alternative includes two pieces, where each piece at its outer cylindrical end is provided with radial inner flange 1B to block the slippage of inner modifiable means to surround and hold the pipe in the coupling body. Each cylindrical piece has a receiving opening therein (as under the first alternative) so that the coupling body closely receives and surrounds the end portions of the pipes to be coupled. The length of each piece of coupling body depends on the size of the pipe, the material of the pipe, and the fluid pressure in the pipeline. The design of the inner means to surround the end portion of the pipe is dependent on the material of the pipe and on the wall thickness of the pipe, and on whether the pipe is plain ended or has a groove or shoulder in its end portion. The coupling can accommodate thermal expansion and contraction of pipes. In case of plastic pipe, if required, pipes ends inside the coupling can be provided with inner inserts to mitigate energy loss through the pipe system.

THE DRAWINGS

The best mode presently contemplated for carrying out the invention is illustrated in the accompanying drawings, in which:

FIG. 5 is a longitudinal vertical view of the coupling body;

FIG. 6 is similar to FIG. 4, being a longitudinal vertical section on the line 1-1 of FIG. 5 showing two inserts mounted around the opposite end portions of the pipes;

DETAILED DESCRIPTION OF THE ILLUSTRATED EMBODIMENT

The drawings are not drawn to any particular scale. Once the repetitive elements of the coupling have been explained once, they will not be explained again, unless needed. Except for bolts, nuts, and openings and cuts for the bolts, all other elements of the coupling are cone shaped or cylindrical; therefore, for clarity of the drawings, only the needed hidden lines are shown, but this fact is compensated for by providing needed perspective views clearly depicting each part of the coupling. The outer coupling body is made from two opposite pieces held together by means of a joint described as a doubled up mechanism. Each piece may further be divided into at least two parts, and when said parts are assembled, the doubled up mechanism remains the same in its functionality. It is pointed out here that the doubled up mechanism of the coupling remains the same in all drawings. Beyond the range of the double up mechanism, two sides of the coupling body are defined as the outer body of the coupling. Two alternative designs for the outer body are presented.

Figure 8:
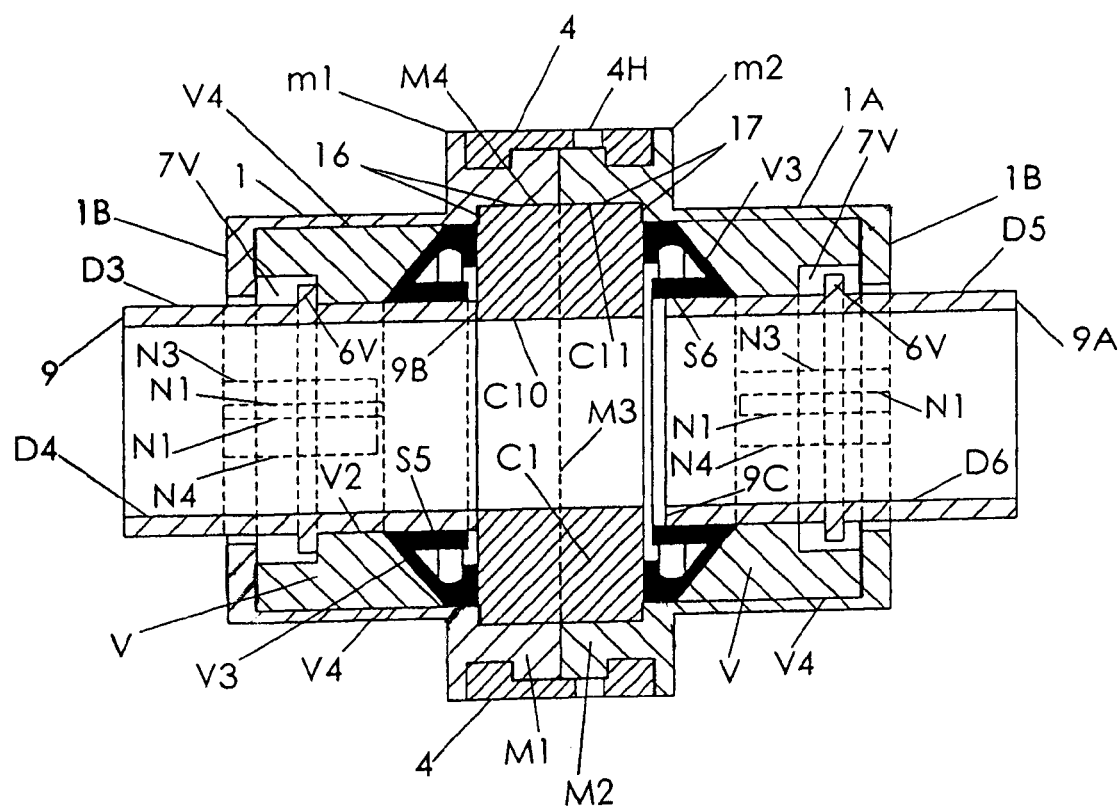
FIG. 8 is a longitudinal vertical section of the cylindrical coupling of FIG. 7, including the mounted inner means and the two pipes being connected.
Figure 9:
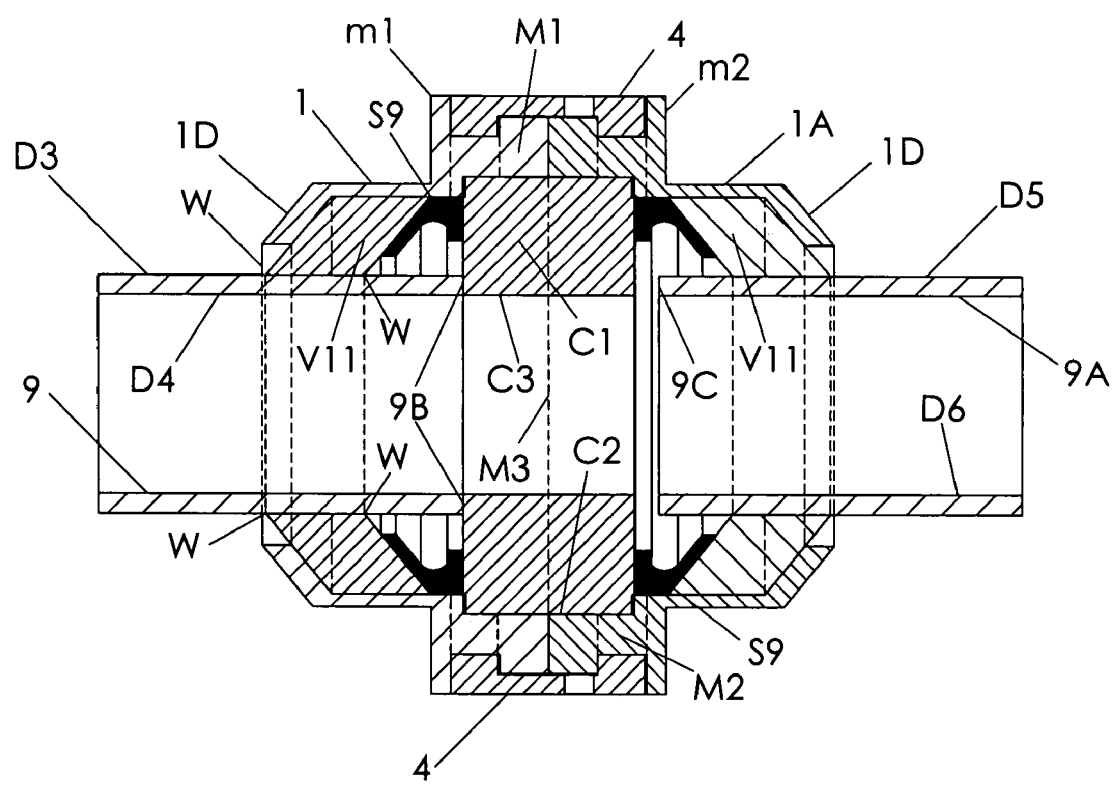
FIG. 9 is similar to FIG. 8, a longitudinal vertical section of a cylindrical coupling, where inner means are inclined flanges provided around pipes, and the outer coupling body is modified to accommodate said flanges.

The first alternative shows tapered cylindrical outer bodies. The second alternative is depicted in FIGS. 8 to 9, where cylindrical outer bodies are provided with inner end radial flanges 1B and 1D, respectively. It is also pointed out here that, most of the time, mirror views of the outer body and the inner means shown in cross-sections are depicted by the same numerals, unless otherwise needed.

Figure 1:
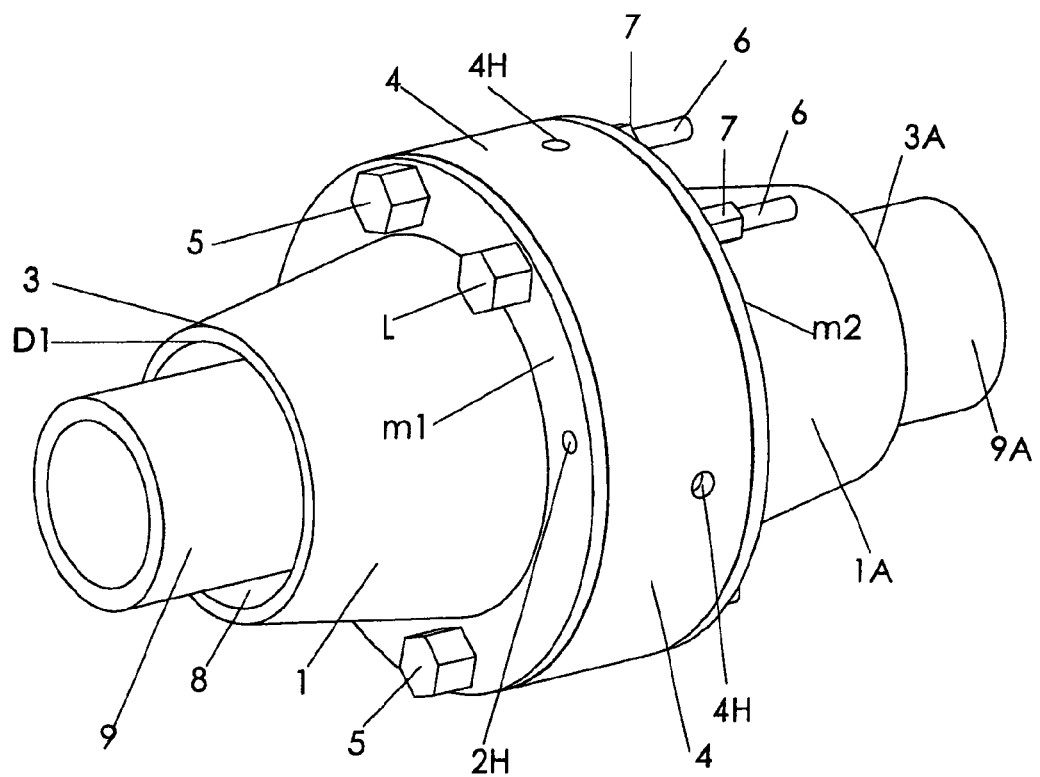
FIG. 1 is a perspective view of the coupling with tapered ends.
Figure 2:
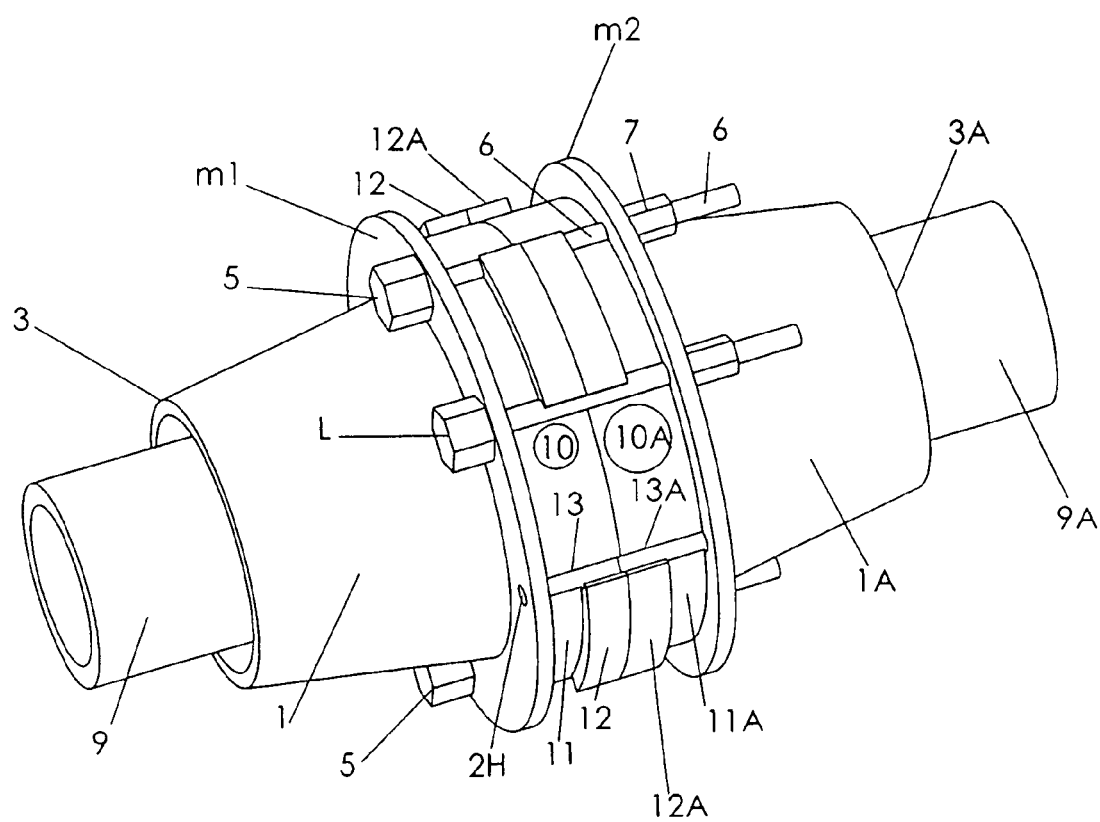
FIG. 2 is a perspective view of the coupling with the cover removed, showing the doubled up locking means and intermittent shoulders around the main flanges.
Figure 2A:
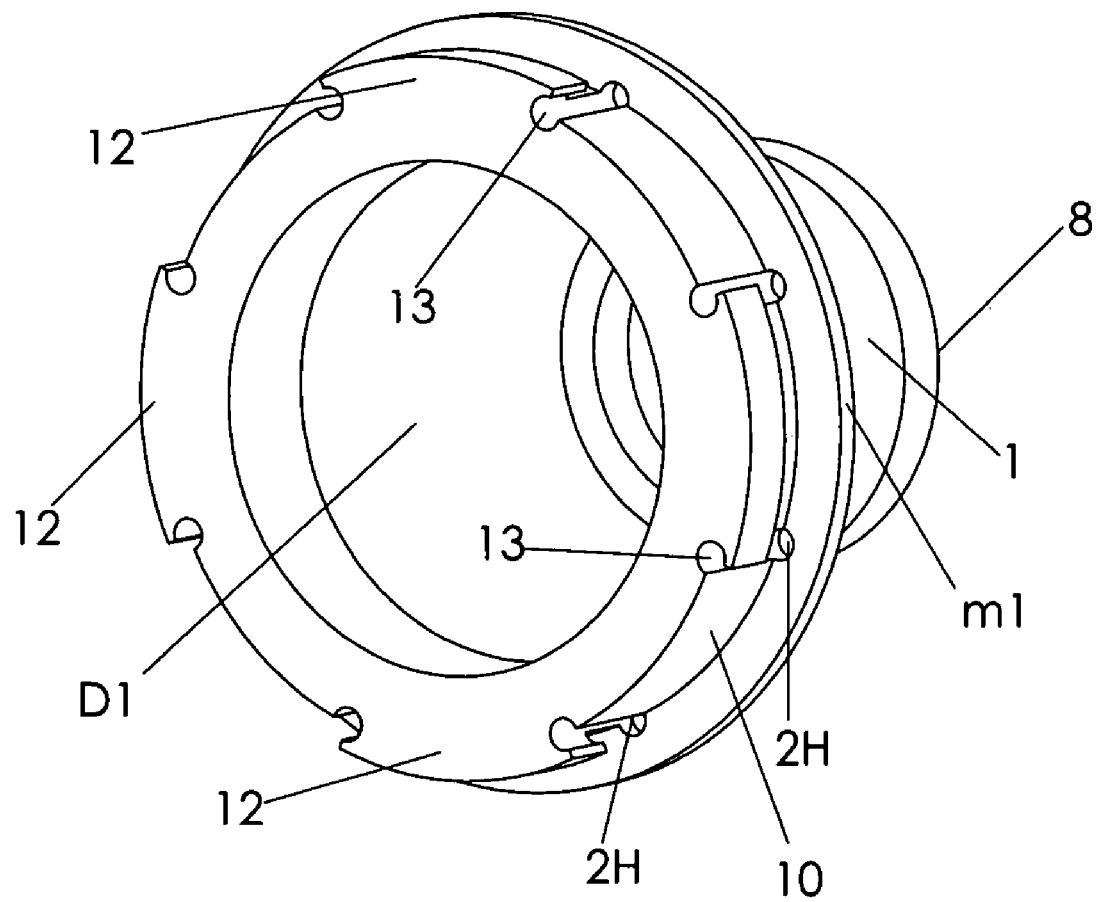
FIG. 2A is a perspective view of modified piece 1, provided with an inner radial flange at the outer end.
Figure 3:
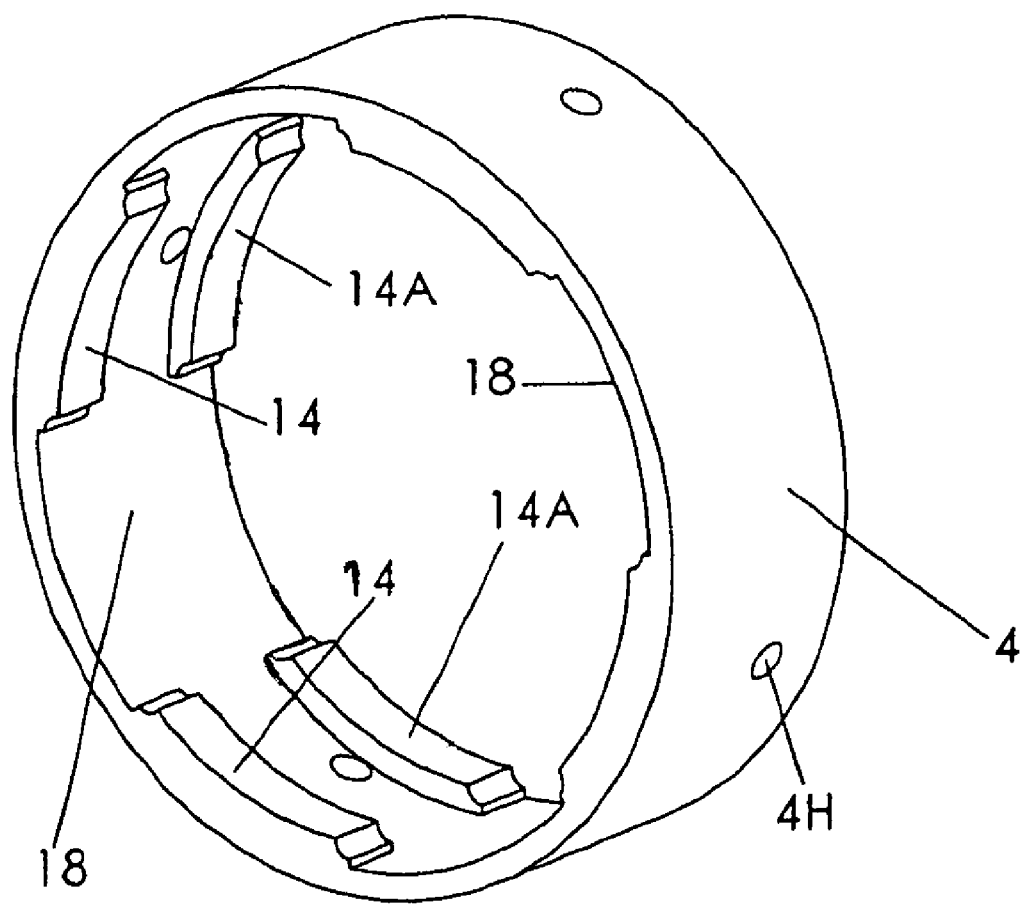
FIG. 3 is a perspective view of the cover showing intermittent inner flanges.

FIGS. 1 to 3 show perspective views of the coupling body, which will be explained simultaneously with other FIGS. 4, 5, 6, 12, and 13, which show tapered bodies. The tapered portions of the outer body of the coupling are depicted by 1 and 1A. The length of the coupling body is shown between its ends 3 and 3A. Pipes being connected by the coupling are shown by 9 and 9A. The pipe ends inside the coupling are indicated by 9B and 9C. FIGS. 2, 2A and 3 show the hidden portions of the doubled up mechanism, where cover 4 is removed. Once each piece of the coupling, and the inner means to hold the pipes are properly positioned in respective sequence around the pipes, then simultaneously radial opposite main flanges M1 and M2 and cover 4 are properly positioned by means of bolts 5 and nuts 7. To match bolt openings properly, openings 2H for bolts 5 are painted around with colored paint; and cover 4 is positioned properly by positioning openings 4H against painted spots or marks (not shown) on the outer rim of flange m2. The empty space over main flanges M1 and M2 between secondary flanges m1 and m2 is depicted by 10 and 10A, and the empty space between shoulder 12 and flange m1 is depicted by 11, and the empty space between shoulder 12A and flange m2 is depicted by 11A. By positioning intermittent shoulders 14 and 14A of cover 4, shown in FIG. 3, in the intermittent empty spaces indicated by 10 and 10A in FIG. 2, while also positioning intermittent spaces 18 of cover 4 over shoulders 12 and 12A in FIG. 2, cover 4 is installed by means of bolts 5, which are mounted through bolt openings 2H and cuts 13 and 13A. The number of bolts to compress the plugs P1 and P2 are predetermined, and can vary according to the size of coupling. As is shown in FIG. 2, at least a set of three bolts, including locking bolt L, to lock cover 4 in place, is required. Once bolts 5 are tightened, then cover 4 is rotated by means of openings 4H with the aid of a rod or a screw driver held inside 4H functioning as a handle (or by right angle bracket means attached to cover 4 as shown by B11 and B12 in FIG. 4) until intermittent shoulders 14 and 14A are matched with intermittent shoulders 12 and 12A, and are locked in place, by means of bolt L. At least one bolt L is used to lock cover 4. Once the cover 4 is secured in place, bolts 5 are relaxed and the pressure load on the bolts is transferred against intermittent shoulders 12, 12A and 14 and 14A. It is understood that the numbers of intermittent shoulders 12 and 12A; and 14 and 14A can vary for different sizes of coupling body. Though, not shown, preferably elastomeric or metallic lock-washers will be used between flanges m1 and m2 bolt heads and nuts, respectively. Cuts 13 and 13A are designed such that preferably half the thickness of each stem of said bolts is mounted inside circular cuts 13 and 13A and half the thickness of that bolt stem 6 is projected outside of said cuts. It is pointed out here, though not shown, that inner tapers of the outer body of the coupling can extend through the entire length of each piece of coupling. Locking bolt L prevents the rotation of the cover with respect to flanges m1 and m2. Radial flanges M1 and M2 of the coupling meet face to face in the radial plane M3. The inner diameter of each flange M1 and M2 is depicted by M4. The stems 6 of bolts 5 pass through the corresponding openings 2H provided in the secondary flanges m1 and m2 and through open cuts 13 and 13A provided through M1 and M2. Cuts 13 are also shown in FIG. 2A. The threads on the bolt stem are not shown.

Figure 12:
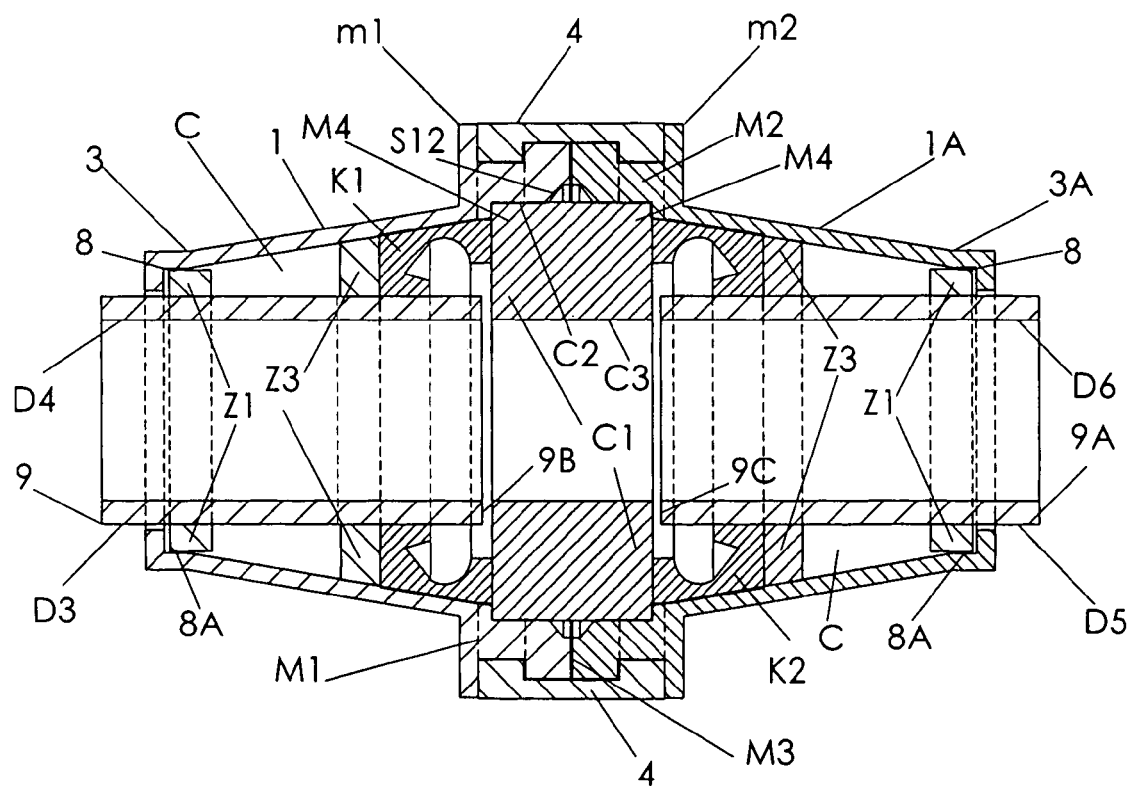
FIG. 12 is similar to FIG. 4, where the inner plug means to surround and hold the pipe is modified.
Figure 13:
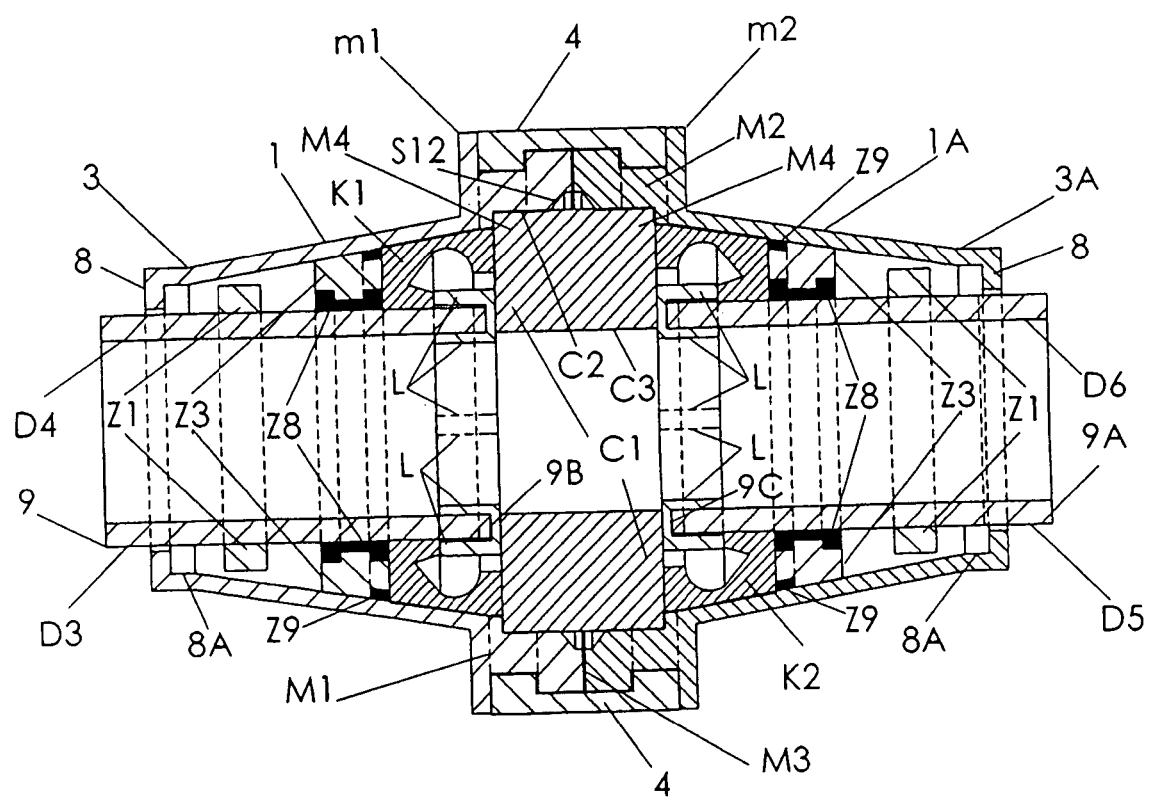
FIG. 13 is similar to FIG. 12, where two inserts are provided around the end portions of the pipes to accommodate pipe shrinkage (calculated by Poisson's Ratio) in the pipe and to accommodate change in the length of pipe due to the thermal environment.

FIG. 2A is the perspective view of piece 1, where a modified end of said piece is provided with an inner radial flange indicated by 8, and its other version is shown in FIGS. 12 and 13. All other elements of piece 1 have been discussed earlier.

Figure 4:
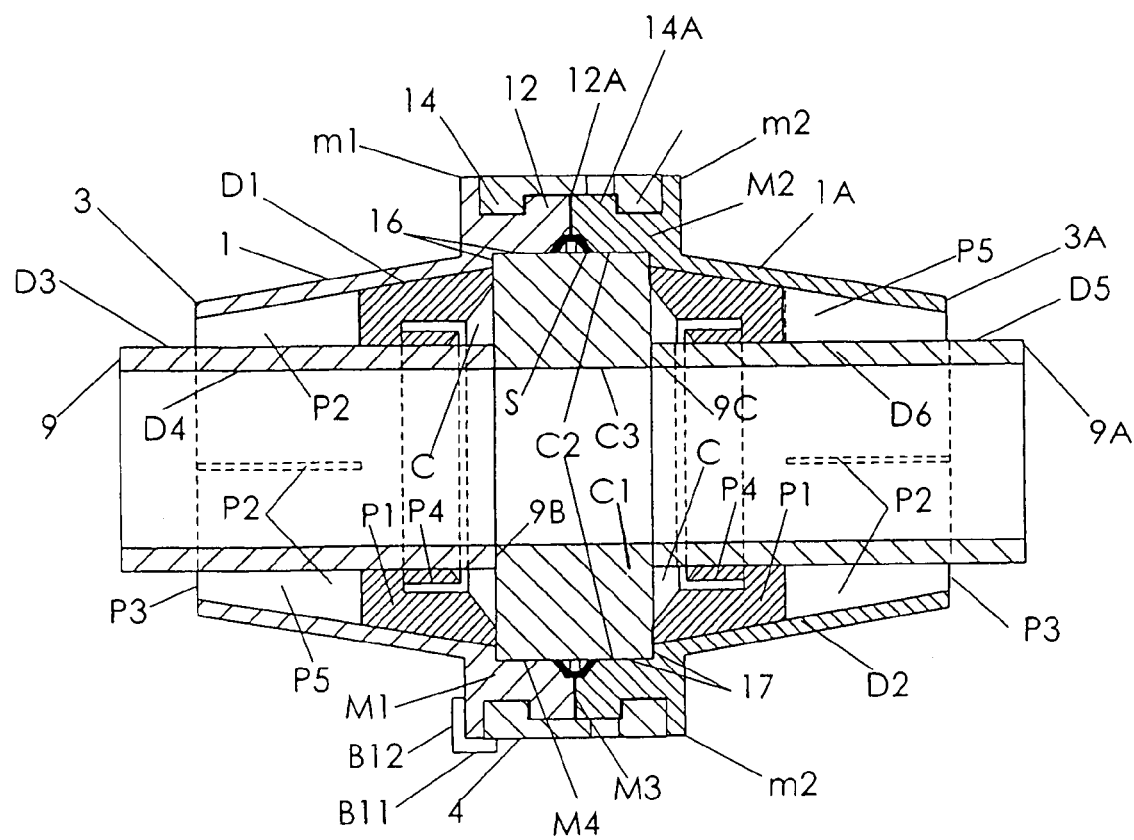
FIG. 4 is a longitudinal vertical section of the coupling shown in FIG. 1, including two pipes held inside the coupling body by means of inner plug means and a partitioning washer ring.

FIGS. 4 to 6 can be studied together. FIGS. 4 and 6 are the longitudinal vertical section of the coupling body shown in FIG. 5, differing only in the way cut P4 is provided in portion P6 of the plugs P shown in FIG. 10. FIG. 4 shows cut P4 inside said portion P6, and in FIG. 6 cut P4 is shown in inner surface of portion P6. FIG. 6 shows two inserts L mounted around the ends 9B and 9C of pipes 9 and 9A, respectively, where inserts are mounted inside cuts P4 provided in portions of P6 of elastomeric plugs P. Plugs P are means to seal axial leakage of fluid from the coupling body, and they are also means to grip around the end portion of the pipe to hold the pipe securely inside the coupling body. Each plug is divided into two portions P5 and P6 at least, where portion P5 is provided with linear cuts P2 to make it easier to mount the portion P5 around the pipe. Two ends of the plug are depicted by P3 and P7. The portion P1 between said portions P5 and P6 functions as a seal to seal the axial leakage of fluid through the coupling body. Fluid pressure in the pipeline acts against portions P6, assisting to establish the firm grip of plugs around the end portions of pipes. Inserts and the plugs are separated by means of partitioning washer ring C1, which prevents the slippage of said ends of pipes out of the coupling body. Each insert is delineated by inner and outer cylindrical portions L2 and L1, respectively, which are connected by radial flange L3. The ends of inserts are indicated by L4. Radial fluid leakage is prevented by means of seal S. Seal S is mounted in the cavity created between two opposite main flanges M1 and M2 and partitioning ring C1, where C1 is positioned in the opposite inner grooves shown by 16 and 17. Outer and inner diameters of C1 are depicted by C2 and C3, respectively, in FIG. 4. Other features and parts of FIGS. 4, 5 and 6 have been explained earlier, except that inner surfaces of two coupling pieces are indicated by D1 and D2. The outer and inner diameters of pipes 9 and 9A are shown by D3, D5 and D4 and D6, respectively. Shoulders 12, 12A and shoulder 14, 14A of the doubled up mechanism are shown in a locking position. In FIG. 4, cylindrical cut P4 in portion P6, when charged by the pressurized fluid from the pipeline, further assists the plug to secure a proper seal and grip around the pipe. It is understood that portions P6 of the plugs may not be provided with any cuts P4 if inserts are not required. If the length of the plug dictates, then linear cuts similar to P2 will also be provided in portion P6.

How the coupling is installed will be explained now. First each piece 1 and 1A of the outer coupling body is mounted around each end of the pipe, then each piece is pushed away from the ends of the pipes to a sufficient distance so that the coupling's inner means are mounted around the end portions of the pipes, then partitioning means are fitted into one of the main flanges M1 or M2 before said main flanges are brought into face to face contact with each other and before cover 4 is locked in place as explained earlier. Before said fitting of said partitioning means into one of main flanges M1 or M2 can be accomplished, the corresponding piece 1 or 1A will be positioned over the inner means to a degree to allow the partitioning means to be received by the main flange. Partition ring C1 prevents the slipping away of the pipe ends from the coupling body. The length of the coupling is predetermined for each size of pipe according to fluid pressure in the pipeline and material of the pipe. In the case of a coupling body provided with slip on joints, the coupling will be installed in the same way as explained above.

Figure 7:
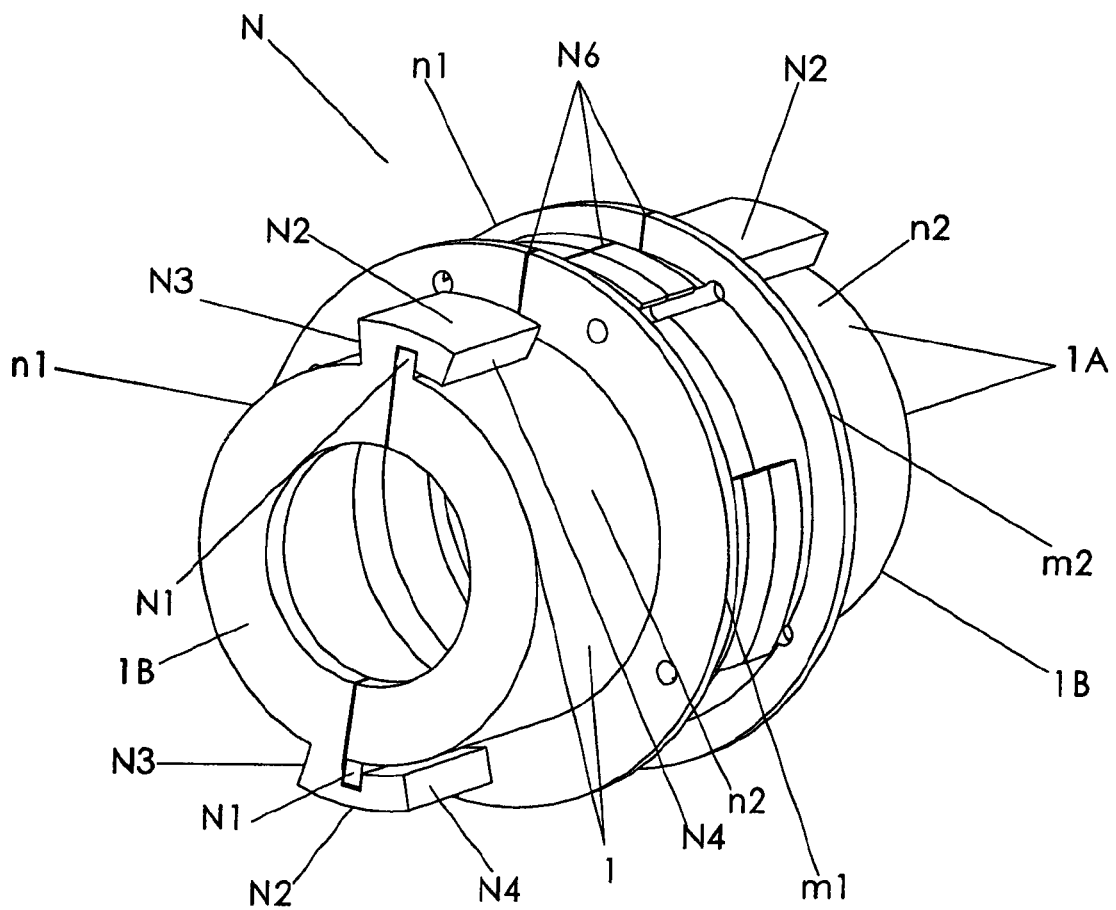
FIG. 7 is a perspective view of the cylindrical coupling body where each piece of the coupling body is divided into two parts, where said parts are held together by means of a slip on joint.
Figure 7A:
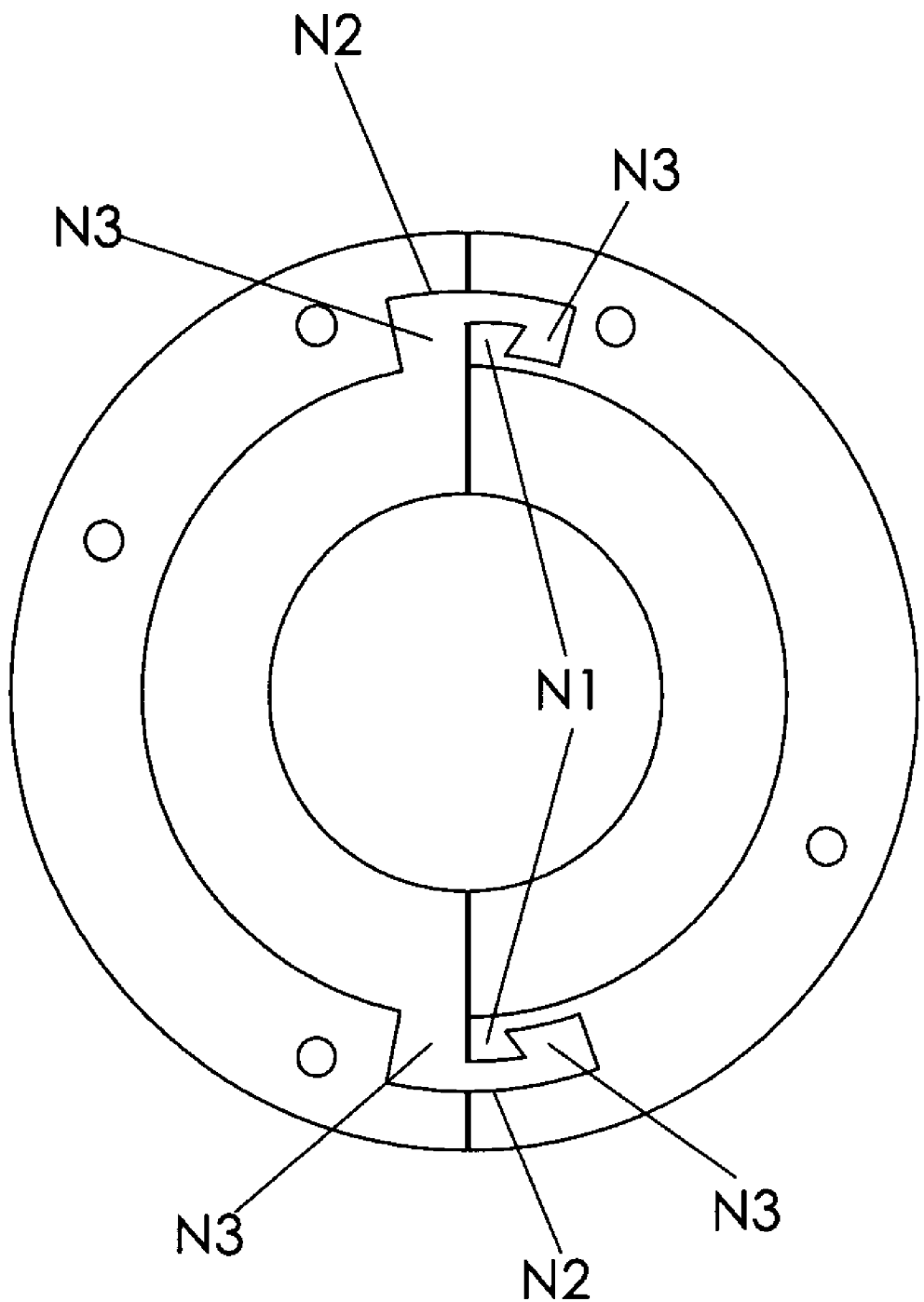
FIG. 7A shows a side view of the second version of the slip on joint shown in FIG. 7.
Figure 7B:
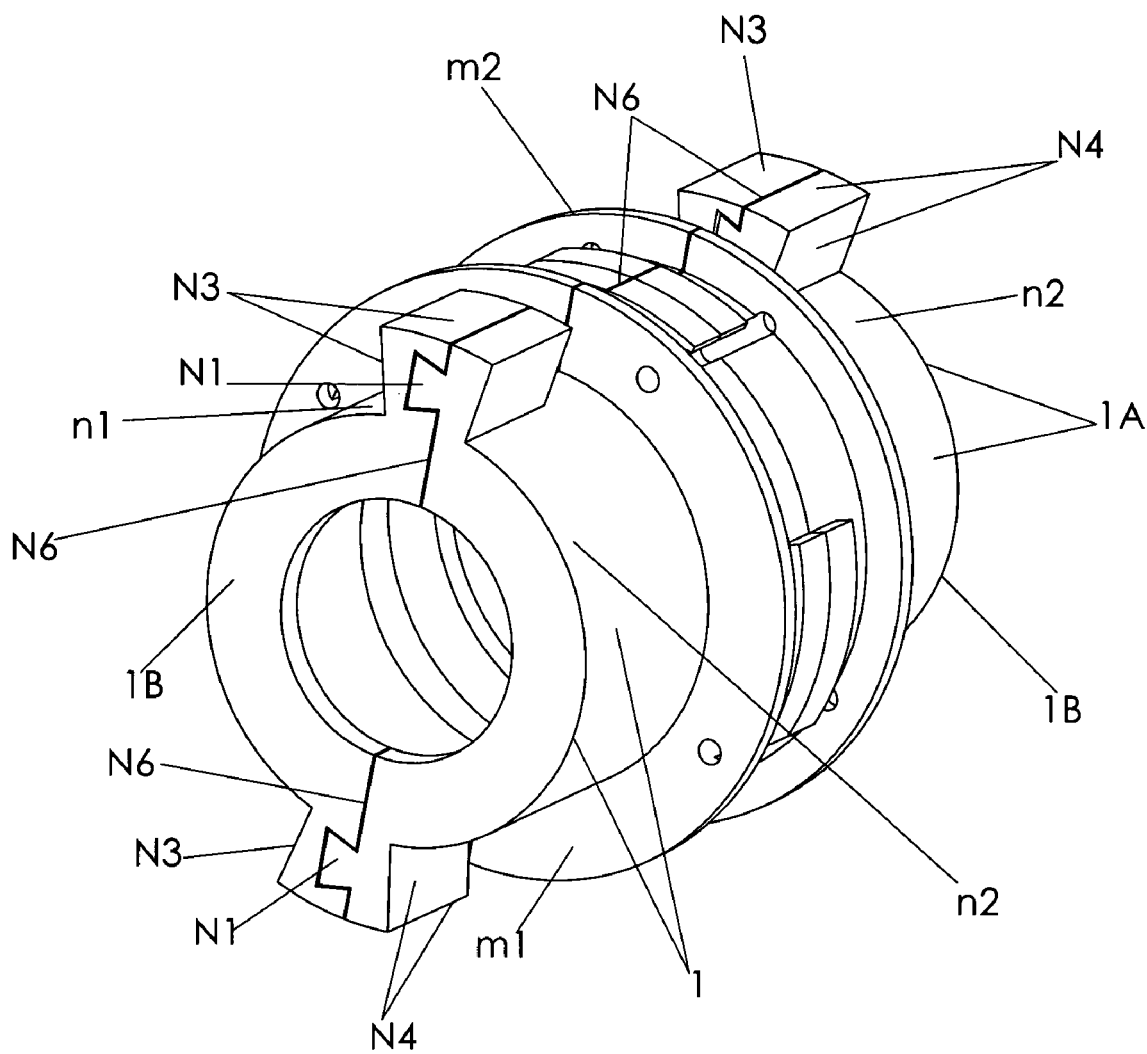
FIG. 7B shows a third version of the slip on joint shown in FIG. 7.

FIGS. 7; 7A and 7B will be studied together. FIG. 7 is the perspective view of the coupling N, where tapered portions 1 and 1A of the coupling body are modified into cylindrical portions, and each piece of coupling is further divided into two parts n1 and n2. Said parts n1 and n2 are held together by means of flange N1 on part n2, and two flanges N3 and N4 connected by means of a bridge N2. Flange N3 is integrated with part n1. The doubled up mechanism remains the same as the coupling shown in other FIGS. Split between part n1 and n2 is indicated by N6. The rest of the coupling was explained earlier. It is pointed out here that this type of slip on joint can also be provided for tapered couplings. FIG. 7A is similar to FIG. 7, except that the slip on joint is a half dovetail joint shown in the side view of a coupling body. This joint is only for the cylindrical body, and not for the tapered body. FIG. 7B is the dovetail joint, where tail N1 on flange N4 is locked into mortise in flange N3. The split between parts n1 and n2 is indicated by N6. This joint is only for the cylindrical outer body; not for the tapered body.

FIG. 8 is a longitudinal vertical section of a cylindrical coupling. Piece 1 and piece 1A are cylindrical mirror views of each other and are provided radial flanges 1B to block the slippage and pullout of sleeve plugs V and pipe end portions. But, said pieces 1 and 1A are not mirror views of each other when the inlet pipe or fitting is not the same size as the outlet pipe or fitting. Each pipe is locked inside the coupling body by means of shoulder 6V constructed around the pipe, where shoulder 6V is blocked by means of flange 1B. Cylindrical cut 7V (of predetermined length) is provided in each sleeve plug V, and sleeve plug V is mounted around the end portion of the pipe to position cut 7V around shoulder 6V. Each shoulder 6V is constructed by welding a ring around the pipe or it can be constructed by placing a split ring in the corresponding groove constructed around the pipe. The slanting ends V3 of each of the sleeve plugs V act as backup support for gasket seals S5 and S6. The outer radial portion C11 of washer ring C1 is held inside opposite grooves 16 and 17 constructed inside of main flanges M1 and M2, while its inner portion C10 is situated between ends 9B and 9C of opposite pipes. The inner surface of each sleeve plug V is indicated by V2, and its outer surface is indicated by V4. Seals S5 and S6 block leakage of fluid from the coupling. Partitioning ring C1 separates said seal gaskets and provides a gap of sufficient width to allow for the replacement of said seal gaskets during maintenance. Thus, seal gaskets can be removed by separating two pieces 1 and 1A of the coupling and by pulling out ring C1 between the ends of pipes. Partitioning ring C1 can be made from rigid materials including plastic materials. The slip on joint is shown by N1 locked inside of flanges N3 and N4. It is understood that each sleeve plug V can also be constructed from two circular arcuate pieces. It is pointed out here that one piece of the coupling shown in FIG. 8 (or shown in any other FIG.) can be incorporated with the piece of another coupling shown in any other FIGS. If the customer desires double radial sealing, then seal gasket S shown in FIGS. 4 and 6 can be provided. It is pointed out here that slanting face V3 of each sleeve plug V need not to slant, in that case sleeve plug will appear rectangular in vertical section while retaining cut 7V, and outer radial portion of seal between C1 and said face V3 will assume inverted U shape in the vertical section. The rest of the coupling was explained earlier.

FIG. 9 is similar to FIG. 8 accept that the portions 1 and 1A are provided with slanting end flanges 1D. Backup rings for seal gaskets S9, made of slanting flanges V11 will be welded to the end portions of pipes at spots around the pipe as indicated by W on the left side of the FIG. 9. It is also understood that seal gaskets S5 and S6 can also be used with the coupling shown in FIG. 9, and flanges V11 on both sides of the coupling may be left free of welding, depending on the material of the pipe and thermal environment around the pipe. For stable underground thick metallic pipe, at certain locations, where the temperature may not vary much, welding may not be required, since the change in the length of each link of pipe due to temperature variation is small, and since partition means C1 prevents the pipe from being pulled out. When backup rings V11 are welded to pipe, seal gaskets S9 between partitioning ring C1 and slanting backup rings V11 block the leakage of fluid through the coupling body. It is understood that couplings showing slip on joints in FIGS. 7, 7A and 7B can also be used for the coupling shown in FIG. 9. If the customer desires, then seal gasket S, shown in FIGS. 4 and 6, can also be provided. It is pointed out here as it was pointed out under FIG. 8 that sleeve plugs V11 need not to slant, in that case sleeve plugs will appear rectangular in vertical section, and seal S9 will assume inverted U shape in the vertical section between V11 and C1, and inner end flange 1D will appear like flange 1B as in FIG. 8. The rest of the coupling was discussed earlier.

Figure 10:
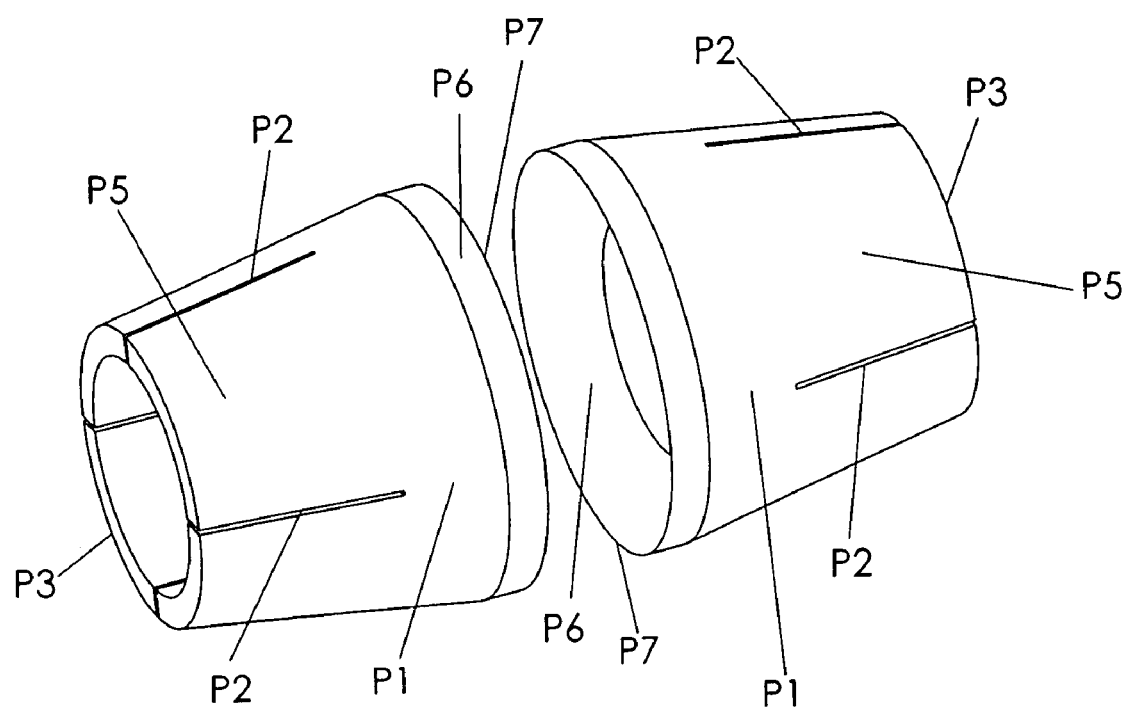
FIG. 10 is a perspective view of two elastomeric plugs shown in FIG. 6.

FIG. 10 is the perspective view of two elastomeric plugs P where each plug has outer back portion P5 provided with linear cuts P2 and front portion P6. If the length of the portion P6 dictates, then cuts similar to cuts P2 may be provided in section P6 of the plug. Portion P1 between the portions P5 and P6 acts as a seal to seal the axial leakage from the body of coupling. The ends of each plug are indicated by P3 and P7. The rest of the drawing was discussed earlier. It is understood that each plug can be constructed from separated parts, and it does not need to be a monolithic structure.

Figure 11:
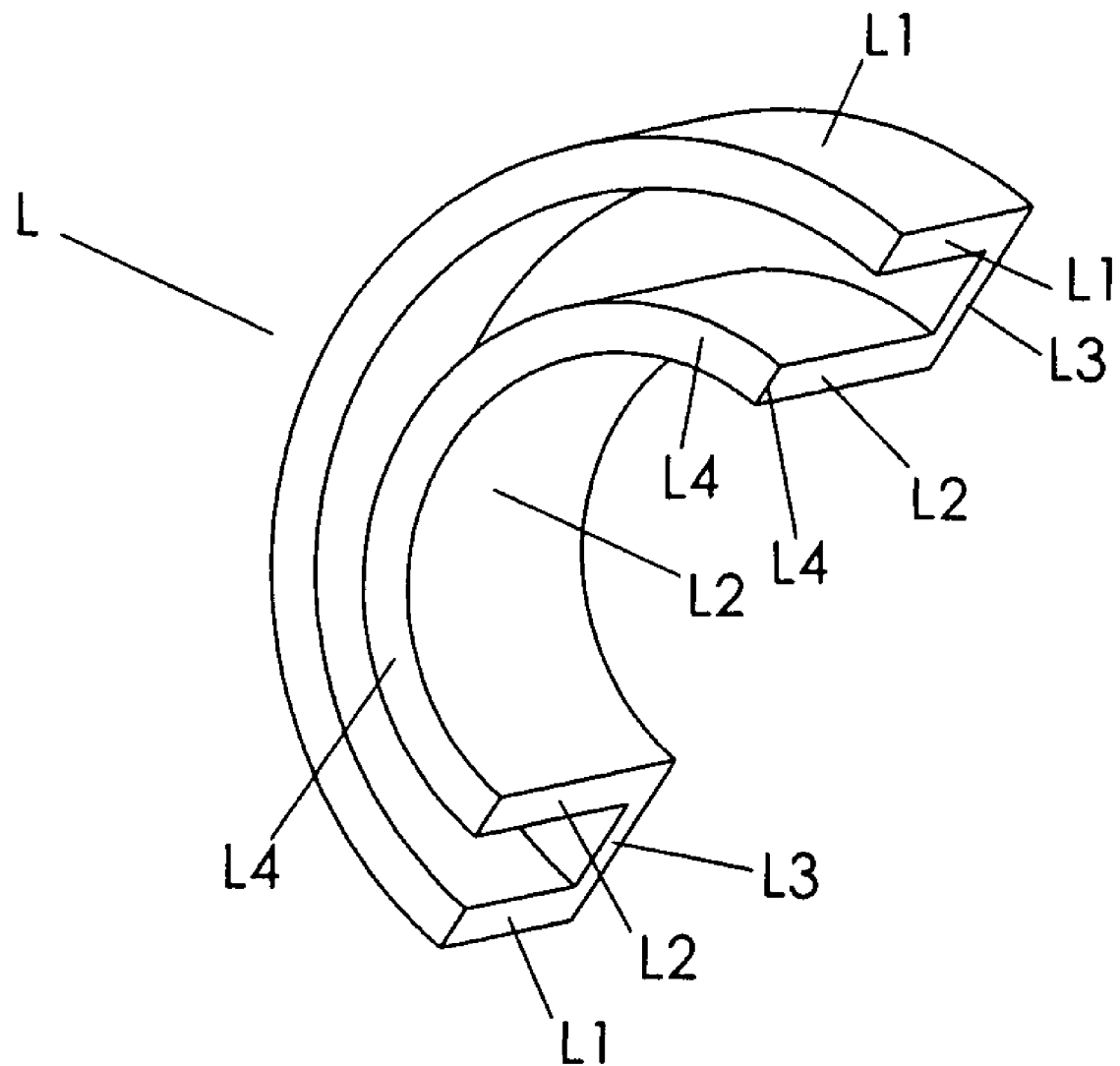
FIG. 11 is a perspective view of each pipe insert shown in FIG. 6.

FIG. 11 shows a perspective view of one pipe insert L, which was discussed earlier with FIG. 6. Each piece of insert is made of two concentric cylindrical arcuate portions of L1 and L2 connected by a common radial web L3. Inserts may be made from metal or plastic or elastomeric material. It is pointed out here that L1 and L2 need not be equal in length as shown in other FIGS. An insert may be a single split piece or it can be a plurality of cylindrical arcuate pieces, and can be more than two pieces, where FIG. 11 shows only one piece.

FIG. 12 and FIG. 13 can be studied together. The coupling in FIG. 12 provides a restrained joint, where the coupling of FIG. 13 provides a joint with a degree of freedom to accommodate change in pipe length due to shrinkage and expansion of the pipe. FIG. 12 and 13 are the same as FIG. 4, except that ends 3 and 3A of each coupling body are modified, and are provided inner radial flange 8 and port 8A to accommodate shoulder Z1 constructed around the pipe, where flange 8 blocks the shoulder Z1, and thus prevents the pipe from being pulled out of the coupling body. Two seal gaskets are placed between backup rings Z3 and partitioning washer ring C1 to block the leakage of fluid through the coupling. Shoulders Z1 may be constructed by welding the shoulders to the pipe or by installing split rings inside of corresponding grooves around the pipes. A second seal S12 similar to seal S shown in FIG. 4 may be provided. The length of cavity C between Z1 and Z3 may be zero or it may be filled by any sleeve made of elastomeric or metallic material depending on the size and type (material) of pipe. The rest of the coupling was described earlier.

FIG. 13 is the same as FIG. 12 except that two inserts L similar to inserts shown in FIG. 11 and discussed in FIG. 6 are mounted around ends 9B and 9C of the pipes 9 and 9A provided to accommodate pipe shrinkage (calculated by Poisson's Ratio) in the pipe and change in the length of pipe due to the thermal environment. Inserts in FIG. 13 are indicated by L. The lengths of portions L1 and L2 are predetermined. Shoulder Z1 in FIG. 13 and previously explained in FIG. 12, is now situated at a distance from port 8A and backup ring Z3. Elastomeric pieces are mounted around backup ring Z3 indicated by Z8 and Z9, which function as seals, where section Z8 functions to also prevent damage to the pipe surface when the pipe moves under Z8. The pipe cannot come out of the coupling as explained in FIG. 12, but the predetermined location of the shoulder Z1 on each pipe allows the pipe to shrink or expand due to the thermal environment around the pipe. As soon as the pipe is pressurized, the pipe shrinks, and how the pipe will behave later on depends on the temperature change around the pipe. Two elastomeric seal gaskets K1 and K2 are installed between backup rings Z3 and partitioning washer ring C1. Each shoulder Z1 may be constructed by welding a ring to the pipe (welding is not shown). Shoulder Z1 can also be constructed by placing a split ring 1Z inside a groove not shown. Each shoulder Z1 is blocked by flange 8. Thus the pipe is prevented from being pulled out of the coupling body. A seal gasket may be provided inside of cavity S12. The rest of the drawing was explained earlier. It is also pointed out here that (according to the type, size and environment around the pipe) backup ring Z3 may be modified to take the shape of V11 shown in FIG. 9, and the backs of seal gaskets K1 and K2 will slant too to match the slants of backup ring V11. It is also understood that backup ring Z3 of FIG. 13 can be the same ring Z3 as shown in FIG. 12. The rest of the coupling was explained earlier.

Figure 14:
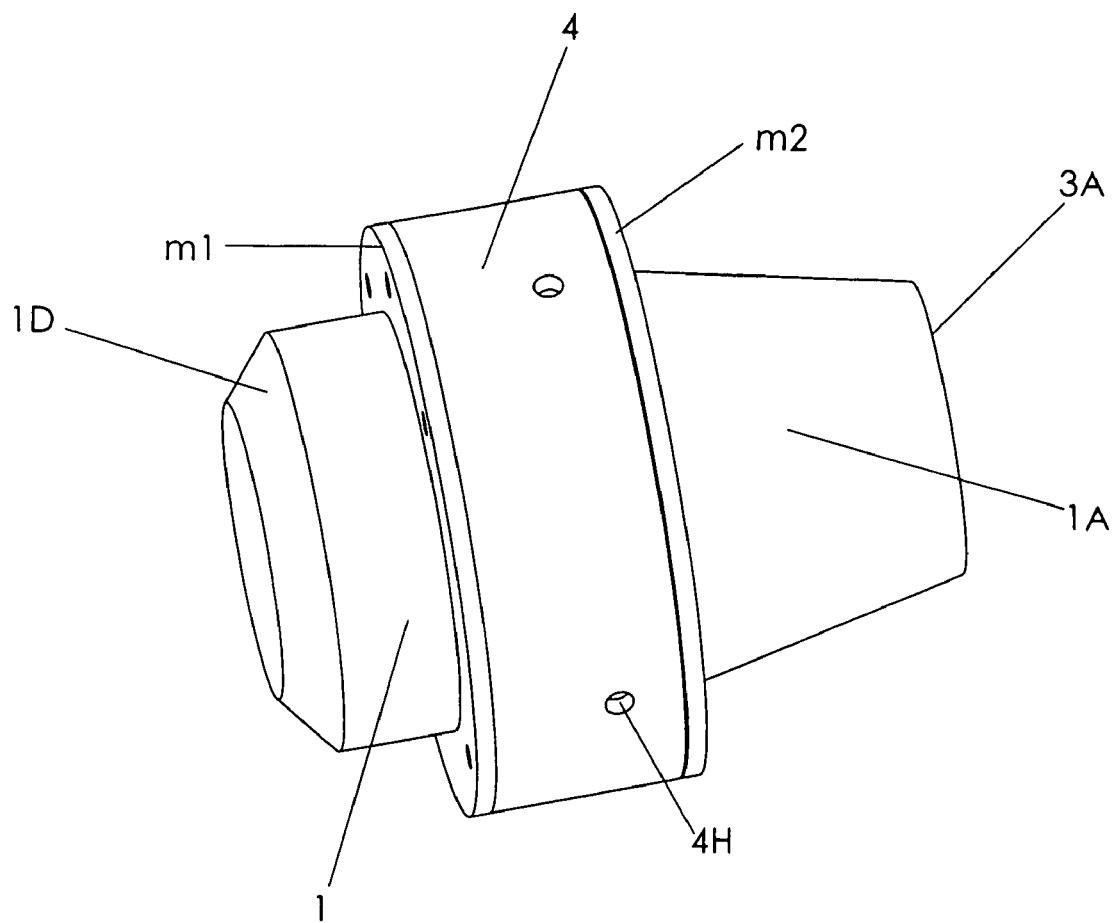
FIG. 14 is a perspective view of a coupling, where the left piece is taken from coupling body shown in FIG. 9, and the right piece is taken from coupling body shown in FIG. 4.

FIG. 14 a perspective view of a coupling, where left piece 1 is taken from coupling body shown in FIG. 9, and right piece 1A is taken from the coupling body shown in FIG. 4, and the same centrally located interlocking, doubled-up mechanical mechanism is retained. Thus it is clear that the coupling can have one piece tapered and the other piece cylindrical in construction, and that the pieces are not mirror views of each other.

Figure 15:
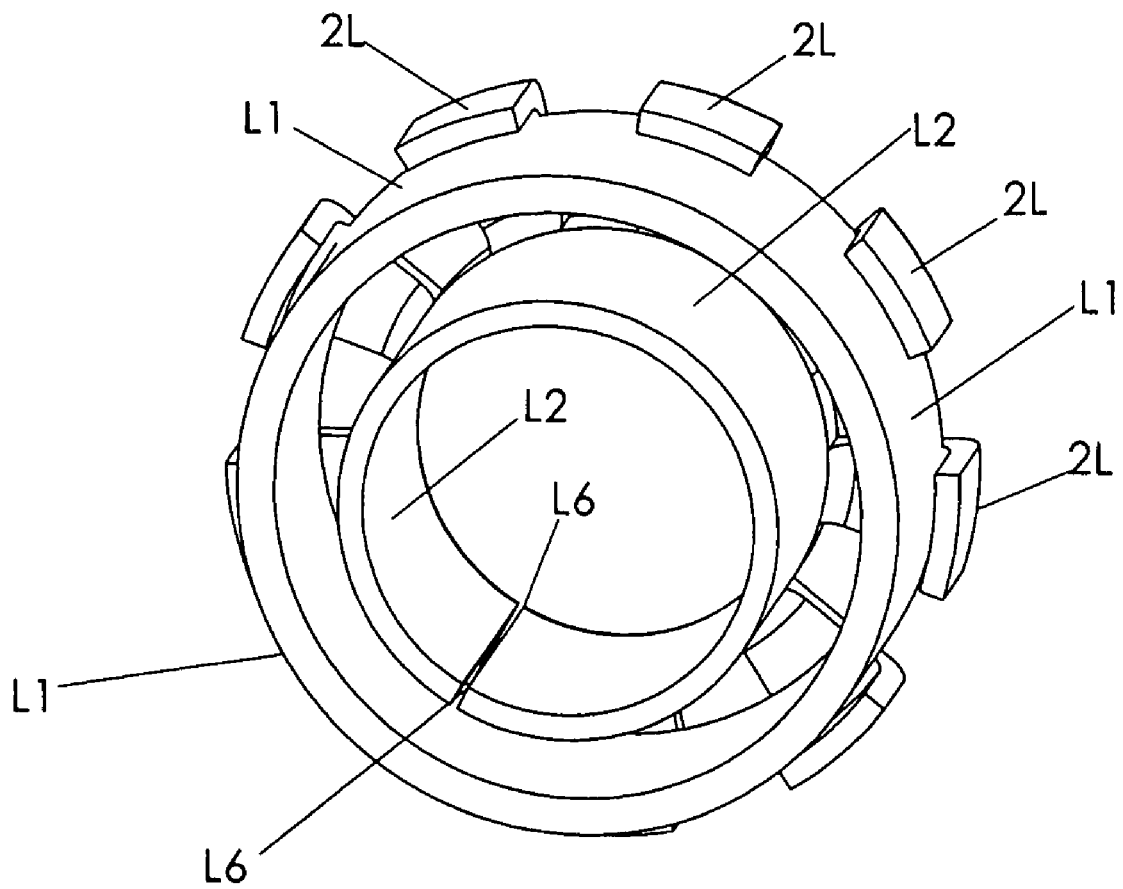
FIG. 15 is a perspective view of another version of insert.
Figure 16:
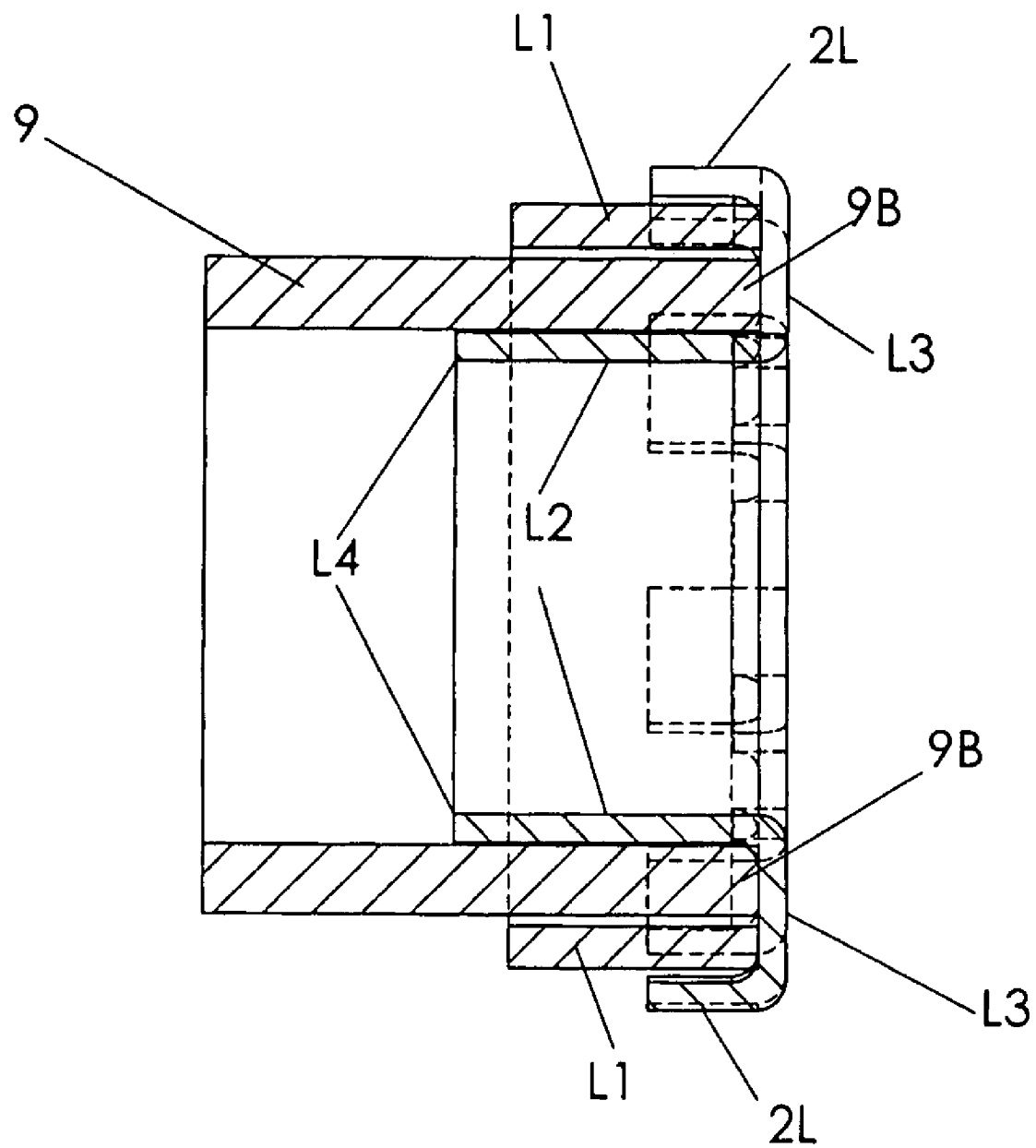
FIG. 16 is the longitudinal vertical section of the insert of FIG. 15 mounted on the end portion of a pipe.

FIGS. 15 and 16 will be explained together simultaneously by retaining the same numerals used earlier to explain inserts. FIG. 15 shows a perspective view of another version of insert. Inner portion L2 of the insert is provided with integral fingers L3 curved into end portion 2L, which overlap outer cylindrical leg L1. FIG. 16 shows the insert of FIG. 15 mounted around end portion 9B of pipe 9.

It is understood now that the two pieces 1 and 1A of the coupling body, and internal means of coupling can be modified to meet various needs of pipes made from different types of metal or plastic materials. It is understood that the outer coupling body and the inner means can be made from different types of material. It is further understood that, wherever necessary, any corners of the coupling body, and internal parts, including the gaskets, can be rounded off or tapered as required. It is also understood that any section of the elastomeric plug or the entire body of the plug can be provided with internal reinforcement. It is also understood that elastomeric plugs may be produced in sections and installed in sections as distinct entities. It is further understood that the partitioning washer ring and inserts can be made of any types of materials; metal, plastics, rubber or any elastomeric material. It is further understood that various changes may be made in adapting the invention to different embodiments without departing from the broader inventive concepts disclosed herein and comprehended by the claim that follow.

I claim:

1. A doubled up pipe coupling for attachment to the end portions of two pipes, comprising:

a two piece coupling body, where each piece has an inner end, an outer end, a main radial flange extending from the inner end of the piece toward the outer end of the piece with a secondary radial flange extending radially beyond the main radial flange and spaced from the inner end of the piece, intermittent radial flange shoulders extending radially from the main radial flange, and a receiving opening to receive and surround the end portion of one of the pipes to be coupled;

an interlocking doubled up mechanism to join the two said pieces of the coupling body and two end portions of pipes simultaneously, wherein a first part of said doubled up mechanism is comprised of the two main radial flanges on the inner end of each piece of the coupling body which are held together face to face in mirrored matching positions between the secondary radial flanges by means of fasteners extending between said secondary radial flanges, and a second part of the doubled up mechanism includes a cylindrical cover having intermittent inner radial shoulders which are interlockable upon rotation of the cylindrical cover with the radial flange shoulders positioned intermittently around said main radial flanges, and at least one locking means which prevents the rotation of the cover with respect to the main flanges when the respective cover inner radial shoulders and flange shoulders are interlocked;

an inner means housed by each piece of the coupling to surround and to hold the end portion of the pipe inside of the coupling body piece; and means to separate the inner means inside of the coupling body when the coupling body pieces are joined.

2. A doubled up pipe coupling for attachment to the end portions of two pipes according to claim 1, wherein each piece has an inner taper tapering toward the outer end and providing an enclosure for elastomeric plug means, which means surrounds the end portion of the pipes when received in the coupling and said elastomeric plug means forms means to hold the pipe securely inside the coupling body.

3. A doubled up pipe coupling for attachment to the end portions of two pipes according to claim 1, wherein the means housed by each piece of the coupling, to surround and to hold the end portion of pipe inside of the coupling body, are elastomeric plugs having linear cuts in their outer end portions for ease of mounting of said elastomeric plugs around said end portions of pipes.

4. A doubled up pipe coupling for attachment to the end portions of two pipes according to claim 1, wherein the means to separate the inner means is a partitioning washer ring situated between the main flanges of the coupling body, and also between the ends of the two opposite pipes being coupled.

5. A doubled up pipe coupling for attachment to the end portions of two pipes according to claim 1, wherein the means housed by each piece of the coupling to surround and to hold the end portion of pipe inside of the coupling body are sealing means to block leakage from the coupling body.

6. A doubled up pipe coupling for attachment to the end portions of two pipes according to claim 1, wherein the fasteners extending between said secondary radial flanges to hold the main flanges together in face to face mirrored matching positions between the secondary radial flanges are bolts.

7. A doubled up pipe coupling for attachment to the end portions of two pipes according to claim 1, wherein the at least one locking means which prevents the rotation of the cover with respect to the main flanges is at least one locking bolt.

8. A doubled up pipe coupling for attachment to the end portions of two pipes according to claim 1, additionally including means to seal fluid leakage.

* * * * *